(12) United States Patent
Skinner et al.

(10) Patent No.: US 11,979,464 B2
(45) Date of Patent: May 7, 2024

(54) THICK CLIENT AND COMMON QUEUING FRAMEWORK FOR CONTACT CENTER ENVIRONMENT

(71) Applicant: State Farm Mutual Automobile Insurance Company, Bloomington, IL (US)

(72) Inventors: Chad Skinner, Talladega, AL (US); Jason Potts, Morton, IL (US); Scott D. Dies, Eureka, IL (US); Aaron Kammeyer, Clinton, IL (US); Amit Gupta, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/222,341

(22) Filed: Jul. 14, 2023

(65) Prior Publication Data

US 2023/0362260 A1    Nov. 9, 2023

Related U.S. Application Data

(63) Continuation of application No. 17/335,890, filed on Jun. 1, 2021, now Pat. No. 11,757,999.
(Continued)

(51) Int. Cl.
*G06F 15/16* (2006.01)
*G06N 20/00* (2019.01)
(Continued)

(52) U.S. Cl.
CPC ........... *H04L 67/141* (2013.01); *G06N 20/00* (2019.01); *H04L 67/02* (2013.01)

(58) Field of Classification Search
CPC ........ H04L 67/02; H04L 67/141; G06N 20/00
(Continued)

(56) References Cited

U.S. PATENT DOCUMENTS

| 6,243,763 B1 | 6/2001 | Brodsky et al. |
| 6,263,066 B1 | 7/2001 | Shtivelman et al. |

(Continued)

FOREIGN PATENT DOCUMENTS

EP    1163564    12/2001

OTHER PUBLICATIONS

Bozdag, et al., "A Comparision of Push and Pull Techniques for AJAX", 2007 9th IEEE International Workshop on Web Site Evolution, doi: 10.1109/WSE.2007.438.0239, 2007, pp. 15-22.
(Continued)

*Primary Examiner* — Moustafa M Meky
(74) *Attorney, Agent, or Firm* — Lee & Hayes P.C.

(57) ABSTRACT

Various techniques described herein relate to a client application framework for a contact center environment. A role-specific thick client framework may include a web browser-based application having multiple processes that can be distributed across the computing infrastructure of the client device. A portion of the framework may include a container application image received from an internal server of the contact center and launched by the client device. The framework also may include queuing and communication services executing on the client device, which interface with the internal client application and external service providers to support a common queuing framework and an integrated model implementation across the contact center environment.

20 Claims, 6 Drawing Sheets

Related U.S. Application Data

(60) Provisional application No. 63/033,365, filed on Jun. 2, 2020.

(51) Int. Cl.
*H04L 67/02* (2022.01)
*H04L 67/141* (2022.01)

(58) Field of Classification Search
USPC .......................................................... 709/227
See application file for complete search history.

(56) References Cited

U.S. PATENT DOCUMENTS

| | | | |
|---|---|---|---|
| 6,301,246 B1 | 10/2001 | Shaffer | |
| 6,324,580 B1* | 11/2001 | Jindal | H04L 67/101 |
| | | | 709/228 |
| 6,621,895 B1 | 9/2003 | Giese | |
| 6,771,766 B1 | 8/2004 | Shafiee et al. | |
| 6,775,377 B2 | 8/2004 | McIllwaine et al. | |
| 6,904,143 B1 | 6/2005 | Peterson et al. | |
| 7,072,966 B1 | 7/2006 | Benjamin et al. | |
| 7,092,509 B1 | 8/2006 | Mears et al. | |
| 7,233,980 B1 | 6/2007 | Holden et al. | |
| 7,315,616 B2 | 1/2008 | Annadata et al. | |
| 7,353,253 B1 | 4/2008 | Zhao | |
| 7,505,577 B2 | 3/2009 | Annadata et al. | |
| 7,685,037 B2* | 3/2010 | Reiners | G06Q 20/108 |
| | | | 705/38 |
| 7,730,204 B2 | 6/2010 | Pak | |
| 7,788,679 B2 | 8/2010 | Chen et al. | |
| 7,805,487 B1 | 9/2010 | Isaacs et al. | |
| 7,922,493 B1 | 4/2011 | Gennaro et al. | |
| 7,965,995 B2 | 6/2011 | Spector | |
| 8,001,186 B2 | 8/2011 | Kordun | |
| 8,112,391 B2 | 2/2012 | Allen et al. | |
| 8,271,618 B1 | 9/2012 | Kridlo | |
| 8,379,832 B1 | 2/2013 | Lyman | |
| 8,396,205 B1 | 3/2013 | Lowry et al. | |
| 8,806,024 B1 | 8/2014 | Toba Francis et al. | |
| 8,843,616 B2* | 9/2014 | Ochoa | G06F 9/4856 |
| | | | 709/224 |
| 8,959,572 B2* | 2/2015 | Yin | H04L 63/102 |
| | | | 726/1 |
| 9,077,804 B2 | 7/2015 | Kannan et al. | |
| 9,106,736 B1 | 8/2015 | Slovacek | |
| 9,172,806 B2 | 10/2015 | Tuchman et al. | |
| 9,225,684 B2* | 12/2015 | Chandwani | H04L 63/0227 |
| RE45,959 E | 3/2016 | McCord et al. | |
| 9,338,121 B2 | 5/2016 | Ciancio-Bunch | |
| 9,356,896 B2 | 5/2016 | Jesse et al. | |
| 9,515,976 B2 | 12/2016 | Talwar et al. | |
| 9,521,259 B2 | 12/2016 | Davis et al. | |
| 9,569,751 B2 | 2/2017 | Steiner et al. | |
| 9,661,023 B1* | 5/2017 | Fang | G06F 21/577 |
| 9,807,040 B2 | 10/2017 | Mendiola et al. | |
| 9,826,095 B2 | 11/2017 | D'Arcy et al. | |
| 9,843,681 B2 | 12/2017 | Tuchman et al. | |
| 9,911,133 B1* | 3/2018 | Walbran | G06Q 30/0226 |
| 9,930,179 B2 | 3/2018 | Steiner et al. | |
| 9,984,061 B2 | 5/2018 | Isensee et al. | |
| 10,187,459 B2* | 1/2019 | Luo | H04L 67/1001 |
| 10,193,928 B2* | 1/2019 | Singleton | G06F 16/178 |
| 10,275,448 B2 | 4/2019 | Isensee et al. | |
| 10,320,971 B2 | 6/2019 | Ghuli et al. | |
| 10,346,785 B2 | 7/2019 | Tamblyn et al. | |
| 10,445,335 B2* | 10/2019 | Kohan | G06F 16/252 |
| 10,601,991 B1 | 3/2020 | Braddick | |
| 10,601,992 B2 | 3/2020 | Dwyer et al. | |
| 10,671,337 B2 | 6/2020 | Khalatian et al. | |
| 10,671,977 B2 | 6/2020 | Caldwell et al. | |
| 10,693,923 B2 | 6/2020 | Abiezzi | |
| 10,694,040 B1 | 6/2020 | Jiron et al. | |
| 10,997,557 B2 | 5/2021 | Frank et al. | |
| 11,423,448 B2 | 8/2022 | Udupa et al. | |
| 2003/0033369 A1 | 2/2003 | Bernhard | |
| 2003/0078985 A1 | 4/2003 | Holbrook et al. | |
| 2003/0097361 A1 | 5/2003 | Huang et al. | |
| 2004/0024794 A1 | 2/2004 | Jain et al. | |
| 2004/0243617 A1 | 12/2004 | Bayyapu | |
| 2005/0053018 A1 | 3/2005 | Hoppe-Boeken et al. | |
| 2006/0126817 A1 | 6/2006 | Beckett, II | |
| 2006/0256954 A1 | 11/2006 | Patel et al. | |
| 2007/0198284 A1 | 8/2007 | Korenblit et al. | |
| 2007/0203797 A1 | 8/2007 | Annadata et al. | |
| 2008/0126831 A1* | 5/2008 | Downey | H04L 69/40 |
| | | | 714/4.2 |
| 2008/0240404 A1 | 10/2008 | Conway et al. | |
| 2009/0035736 A1 | 2/2009 | Wolpert et al. | |
| 2011/0223574 A1 | 9/2011 | Crawford et al. | |
| 2012/0030298 A1 | 2/2012 | Bells et al. | |
| 2013/0039483 A1 | 2/2013 | Wolfeld et al. | |
| 2013/0086153 A1 | 4/2013 | Vendrow | |
| 2013/0176413 A1 | 7/2013 | Lowry et al. | |
| 2013/0218922 A1 | 8/2013 | DeLuca et al. | |
| 2015/0180845 A1 | 6/2015 | Uomini | |
| 2017/0319112 A1* | 11/2017 | Schmelzeisen-Redeker | |
| | | | A61B 5/14532 |
| 2018/0083898 A1 | 3/2018 | Pham | |
| 2018/0167453 A1* | 6/2018 | Luo | H04L 67/1029 |
| 2020/0099790 A1 | 3/2020 | Ma et al. | |
| 2020/0111377 A1 | 4/2020 | Truong et al. | |
| 2020/0364724 A1 | 11/2020 | Pulugurtha et al. | |
| 2020/0394590 A1 | 12/2020 | Kaimal et al. | |
| 2022/0086279 A1 | 3/2022 | Skinner et al. | |
| 2022/0182492 A1 | 6/2022 | Skinner et al. | |
| 2023/0319188 A1 | 10/2023 | Skinner | |

OTHER PUBLICATIONS

Office Action for U.S. Appl. No. 17/378,204, dated May 11, 2022, Skinner, "Contact Center Messaging", 12 pages.

Office Action for U.S. Appl. No. 17/378,204, dated Sep. 15, 2022, Skinner, "Contact Center Messaging", 13 Pages.

Office Action for U.S. Appl. No. 18/207,086, mailed on Jan. 19, 2024, Chad Skinner, "Monitoring Representatives in a Contact Center Environment", 7 pages.

\* cited by examiner

THICK CLIENT AND COMMON QUEUING FRAMEWORK FOR CONTACT CENTER ENVIRONMENT

RELATED APPLICATIONS

This application is a continuation of and claims priority to U.S. patent application Ser. No. 17/335,890, filed Jun. 1, 2021, and entitled "THICK CLIENT AND COMMON QUEUING FRAMEWORK FOR CONTACT CENTER ENVIRONMENT," which claims priority to U.S. Patent Application No. 63/033,365, filed Jun. 2, 2020, and entitled "THICK CLIENT AND COMMON QUEUING FRAMEWORK FOR CONTACT CENTER ENVIRONMENT," the disclosures of which are incorporated by reference herein in their entirety for all purposes.

BACKGROUND

Large organizations often use automated contact centers to handle various interactions between employees or representatives of the organization and customers or other parties. Different types of organizations, including businesses, government agencies, and educational institutions may use automated contact centers for sales, customer service, technical and software support, problem resolution, and the like. Automated contact centers may be small or large-scale, depending on the amount of customer traffic and the structure of the organization. Large-scale contact centers, for example, may include representatives in different roles and/or different departments, using client systems that are distributed across different data centers, geographic locations, and/or networks. In some cases, a customer call or other contact (e.g., video or chat session) into the contact center may be answered first by an automated computer system which requests a series of inputs from the customer to determine where the contact is to be routed.

The various hardware, network, and software components of a contact center may connect and support interactive media sessions between customers and organization representatives, each working independently on the separate computing devices. The contact center also may support transferring customer interaction sessions to different representatives, multi-party interactive sessions, interactions between organization representatives and administrators, etc. Different combinations of interactive session types and/or media types are supported by various contact centers, such as voice sessions (e.g., telephony-based), video chat sessions, email communications, social media-based sessions, etc. Certain contact centers also may use software-based queuing and routing techniques to connect specific customers with specific representatives based on characteristics and criteria such as the purpose of the customer contact, the session/media type, geographic location, language, representative qualifications and certifications, etc.

Various problems and inefficiencies may result from the software frameworks and applications executed within certain conventional contact centers. For instance, external communication services and third-party tools may provide valuable functionality for contact centers. However, integrating with such services and tools, including performing upgrades, changing services and/or service providers, and the like, may require significant and costly software changes within the internal servers and client devices of the contact center, due to the diverse features and interfaces of the different external services and tools. Contact centers may provide thick or thin client applications for contact center representatives and other personnel to perform interactive communication sessions with customers. While thin client representative applications may provide some advantages, they also have limited functionality and may be unable to interact with the native operating system features and file system of the client device. In contrast, for thick client representative applications, software updates or patches may require uncoordinated and inefficient decentralized software updates.

SUMMARY

To address these and other problem and inefficiencies associated with contact center environments, this disclosure describes various systems and techniques for using a thick client framework having multiple processes that may be distributed across the computing infrastructure of the client device. In some examples, the thick client framework may use include a container application image received from an internal server of the contact center and launched by the client device. The framework also may include queuing and communication services executing on the client device, which may interface with the internal client application and external service providers to support a common queuing framework and an integrated model implementation across the automated contact center.

In an example of the present disclosure, a method includes transmitting client registration data to a service provider associated with an interactive communication service, the client registration data including a network address associated with a client application running a first computing process, receiving a request from the service provider to initiate an interactive communication session via the interactive communication service, launching, by the client application, a second computing process based at least in part on receiving the request from the service provider to initiate the interactive communication session, and initiating the interactive communication session between the client application and the service provider, using the second computing process of the client application.

In another example of the present disclosure, a method includes receiving first data from a first client computing device, the first data associated with a first interactive communication session executed via the first client computing device, receiving second data from a second client computing device, the second data associated with a second interactive communication session executed via the second client computing device, determining a status of a contact center based at least in part on the first data and the second data, and transmitting operational instructions to one or more client computing devices associated with the contact center, based on the status of the contact center.

In yet another example of the present disclosure, a computing system, includes one or more processors and memory storing processor-executable instructions that, when executed by the one or more processors, cause the computing system to receive first data from a first client computing device, the first data associated with a first interactive communication session executed via the first client computing device, receive second data from a second client computing device, the second data associated with a second interactive communication session executed via the second client computing device, determine a status of a contact center based at least in part on the first data and the second data, transmit operational instructions to one or more client computing devices associated with the contact center, based on the status of the contact center.

DETAILED DESCRIPTION

Figure 1:
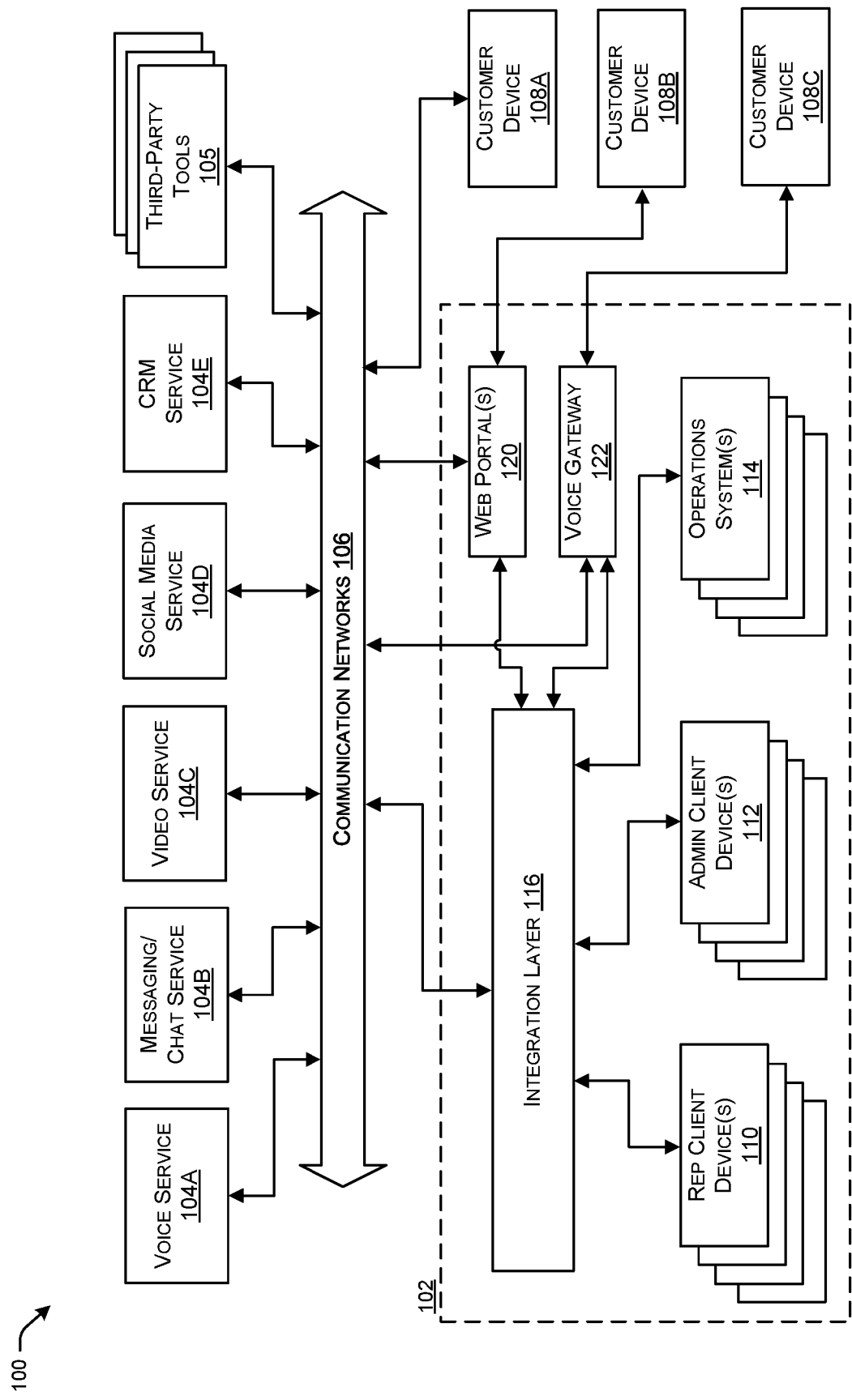
FIG. 1 illustrates a computing environment associated with a contact center, including various internal and external computer systems, services, and user devices, in accordance with one or more examples of the present disclosure.

FIG. 1 illustrates an example computing environment associated with a contact center 100. The contact centers described herein may include fully automated and/or semi-automated contact center environments. In this example, dotted box 102 identifies the internal components of the contact center, and the components outside of the dotted box 102 represent external components associated with the contact center. As used herein, an internal component of a contact center may refer to a component (e.g., computer server or device, network component, software service, application, etc.) that is controlled by the organization operating the contact center. In contrast, an external component of the contact center may refer to a component that interacts with at least one internal component of the contact center, but which is not controlled by the organization operating the contact center. As shown in this example, the external components associated with the contact center may include a number of external communication services 104A-104E (collectively "services 104") and/or tools 105 which may be provided by third-party service providers. Additional external components may include communication network(s) 106 and customer devices 108A-108C (collectively, "customer devices 108") that communicate in interactive sessions with representatives (e.g., employees) of the organization.

In some implementations, the internal components of the contact center may reside within a single server and/or single data center operating at one geographic location. In such cases, some or all of the internal components of the contact center may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via communication networks 106, including but not limited to computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

In operation, contact center 100 may be implemented via the computing environment shown in FIG. 1 to provide interactive communication sessions (or interactive sessions) between customers using various customer devices 108, and representatives of the organization using representative client devices 110 ("client devices 110"). Customer devices 108 and/or client devices 110 may be any personal computing devices, such as desktop or laptop computers, mobile devices (e.g., smartphones, tablet computers, etc.), wearable computing devices, or any other device capable of communicating over communication network(s) 106. In some scenarios, a customer, client, or other individual associated with the organization may use a customer device 108 to contact the organization via a point-of-contact service, such as web portal(s) 120 or voice gateway 122. In some examples, the contact center 100 may support different services for different communication types, such as a web portal 120 that processes web chat requests received via the web site of the organization, a voice gateway 122 that processes calls received via a telephone network and/or Voice over IP (VOIP) calls. Although two customer portals/gateways into the contact center are shown in this example, any number of additional customer portals/gateways may be used in other implementations, such as portals or gateway services for voice communications from customer devices 108, video communications, messaging/chat communications, social-media based communications, customer relationship management (CRM) based communications, etc.

After a customer device 108 initiates communication with the contact center, or vice versa, the contact center components may assign the customer to a representative and initiate an interactive session between the customer device 108 and the client device 110 of the assigned representative. Interactive sessions may include voice sessions, video sessions, messaging/web chat sessions, social media sessions, and/or CRM sessions, etc. As shown in this example, the contact center may use external services 104 to implement the functionality of providing interactive sessions between customers and representatives. For instance, the contact center in this example uses a voice service 104A from a first external service provider, a messaging/chat service 104B from a second external service provider, a video service 104C from a third external service provider, a social media service 104D from a fourth external service provider, and so on. In various examples, the contact center may use any combination of external or internal communication services.

External services 104 may include communication services to implement interactive sessions between a customer and a contact center representative, as well as additional services/tools to support additional features and functionalities of the contact center. For instance, one or more third-party tools 105 may be provided via external service providers and accessed by the internal systems of the contact center. Such third-party tools 105 may include, by way of illustration only, transcript generation and/or analysis tools, customer sentiment analysis tools, sales script tools, contact monitoring tools, data analytics tools, workforce management tools, post-interactive session survey tools, etc. As with the communication services 104A-104E, the third-party tools 105 are depicted in this example as external components of the contact center, but some or all of these tools may be implemented as internal components within the contact center.

As shown in FIG. 1, a customer may initiate communication via a web portal 120 or voice gateway 122, after which the contact center components select a communication service 104A-104E based on the communication type used by the customer, and an interactive session is initiated between the customer device 108 and representative client device 110. Although in this example the customer devices 108 are depicted as initiating communication sessions by first contacting an internal component of the contact center (e.g., web portal 120 or voice gateway 122), in other examples the customer devices 108 may initially contact an external communication service 104A-104E. For example, customer service links on the organization's web site may be hosted by and/or redirected to external services 104. In some cases, the customer communication into the contact center may be answered first by an automated computer system (e.g., implemented within an external service 104 or an operations system 114), which requests a series of inputs from the customer. Such automated systems may be implemented as voice response units for voice calls, conversation bots for web chat sessions, etc. The inputs requested from the customer via an automated system may include data identifying the customer (e.g., customer name, account number, ticket number, etc.), the purpose of the contact (e.g., a question type, a product model, etc.), or the language or geographic region of the customer, and the like. Based on the customer's responses, the automated system may determine where to direct the customer for an interactive session, for instance, to a particular data center, department of the organization, a representative having a particular role, criteria, or credentials, or to a particular representative that has had previous contact with the customer.

In some examples, certain internal components of the contact center may be used to select an external service 104 and initiate a communication session between a customer device 108 and a client device 110, after which the internal components may extricate themselves from the process and allow the selected external service 104 to manage the session. For example, as described below, operations systems 114 and internal computer servers and/or components within the integration layer 116 may receive and analyze data associated with incoming requests for interactive sessions from customer devices 108, and assign the interactive sessions to services 104 and client devices 110 to perform the interactive session. The operations systems 114 and integration layer 116 also may receive and handle requests to transfer contacts from one representative to another, initiate multi-party interactive sessions, and initiate communication sessions between client devices 110 and administrator client devices 112 or entities within the contact center environment. The various operations systems 114 and components within the integration layer 116 also may monitor and analyze the interactive sessions to determine performance metrics for representatives and the contact center as a whole, and to implement policies and instructions based on various models (e.g., contact quality models, efficiency models, workflow projection models, etc.).

The integration layer 116 may provide a common interface between the internal systems and components of the contact center and the external services 104 used by the contact center. For example, client devices 110 may communicate with the external communication services 104A-104E and third-party tools 105 via the components within the integration layer 116. In some cases, the integration layer 116 provides a common framework for interfacing with the external services 104, so that the client applications executing on client devices 110 may perform similar or identical operations regardless of which external service provider is used. In such examples, the integration layer 116 may therefore provide technical advantages and improve the functioning of the contact center components by providing support for plug-and-play among external communication services 104 and third-party tools, without requiring any software change within the client applications executing on the client devices 110 (and/or customer devices 108).

For instance, a voice service 104A provided by a third-party vendor for a contact center may be replaced by a different voice service 104A provided by a different third-party vendor, without requiring any functional change to the client applications executing within the representative and administrator client devices 110. Similarly, the integration layer 116 may interface with multiple different external services 104 for a single communication type (e.g., multiple different voice services 104A, multiple different messaging/chat services 104B, etc.) simultaneously, so the contact center can use multiple external services for a single communication type at the same type, in a manner that is transparent with respect to the external services 104 and the client devices 110. In such cases, an external communication service 104 may operate similarly or identically regardless of whether the contact center is using another service provider to provide an alternative communication service. Client devices 110 also may operate similarly or identically regardless of which external communication service 104 (or internal service) is providing an interactive session for the client device 110.

The integration layer 116 also may provide an interface between internal components of the contact center (e.g., client devices 110, administrator client devices 112, operations systems 114) and third-party tools 105 which operate as services or applications external to the contact center. For instance, the internal operations systems 114 of the contact center may access third-party tools 105, such as data analytics tools, workforce management tools, etc., via the integration layer 116. Client devices 110 also may access third-party tools 105 such as customer sentiment tools, post-interactive session survey tools, etc., via the integration layer 116 during an interactive session between a representative and customer. As noted above, the integration layer 116 may provide a uniform and common interface for accessing external third-party tools 105, so that various third-party tools 105 may be added, removed, replaced, or upgraded, without requiring any changes to the application software of the contact center internal components.

Additionally, the integration layer 116 may provide an interface between various internal components of the contact center. For example, as described below in more detail, client devices 110 may communicate via the integration layer 116, with other client devices 110 and/or with other internal servers/systems of the contact center. For instance, operations system(s) 114 may be implemented within internal computer servers of the contact center, and may provide functionalities for common queuing, monitoring, and analysis and modeling, and policy implementations across the contact center. As described below, client devices 110 may communicate with various operations system(s) 114 via the integration layer 116, allowing the operations system(s) 114 to receive data regarding the interactive sessions executed on the client devices 110, analyze and/or model the data, and determine operational instructions for the client devices 110 to implement operational models (e.g., rules and/or policies)

across the contact center. Such models may include quality control models, workforce management models, contact center efficiency models, etc.

As illustrated by these examples and the other examples described herein, the integration layer 116 may provide additional technical advantages within contact center environments, including improving the functioning and efficiency of client devices 110 and other internal operational systems 114. For instance, the integration layer 116 may provide a common queuing framework for client devices 110, which is capable of managing the work queue(s) for the client devices 110 (e.g., live customer contact queues, deferred work item queues, etc.) received from various external and internal contact center services. As noted above, the integration layer 116 also may provide internal operational systems 114 with detailed data regarding interactive sessions from diverse client devices 110 in a consistent and uniform manner, allowing the operational systems 114 to improve the performance, contact quality, and workflow across the contact center. Operational systems 114 also may include rules engines using heuristics and/or trained machine-learned models to analyze the interactive session data received from different client devices 110, and may transmit instructions and/or policies to client devices 110 across the contact center to implement uniform and consistent models.

The integration layer 116 is depicted in FIG. 1 as a separate internal component of the contact center. In such examples, the integration layer 116 may include one or more dedicated computer servers and/or software applications or services configured to perform the functionalities of the integration layer 116 described herein. In other examples, the integration layer 116 depicted in FIG. 1 may represent a conceptual layer, in which some or all of the components and functionalities of the integration layer 116 may be implemented within other internal or external devices and systems. For instance, any or all portions of the integration layer 116 may be implemented within the external communication services 104 and/or other external services provided by third-party vendors. Additionally or alternatively, some or all of the integration layer 116 may be implemented within the client devices 110, administrator client devices 112, and/or operations systems 114 within the contact center. For example, as described below in reference to FIGS. 2-3, client devices 110 may include client applications, queue façades and/or communication facades to initiate and manage communications with external services 104 and other internal components/systems. These applications, façades, and other services or interfaces of the client devices 110 and/or other operations systems 114 of the contact center may implement various portions of the integration layer 116.

Figure 2:
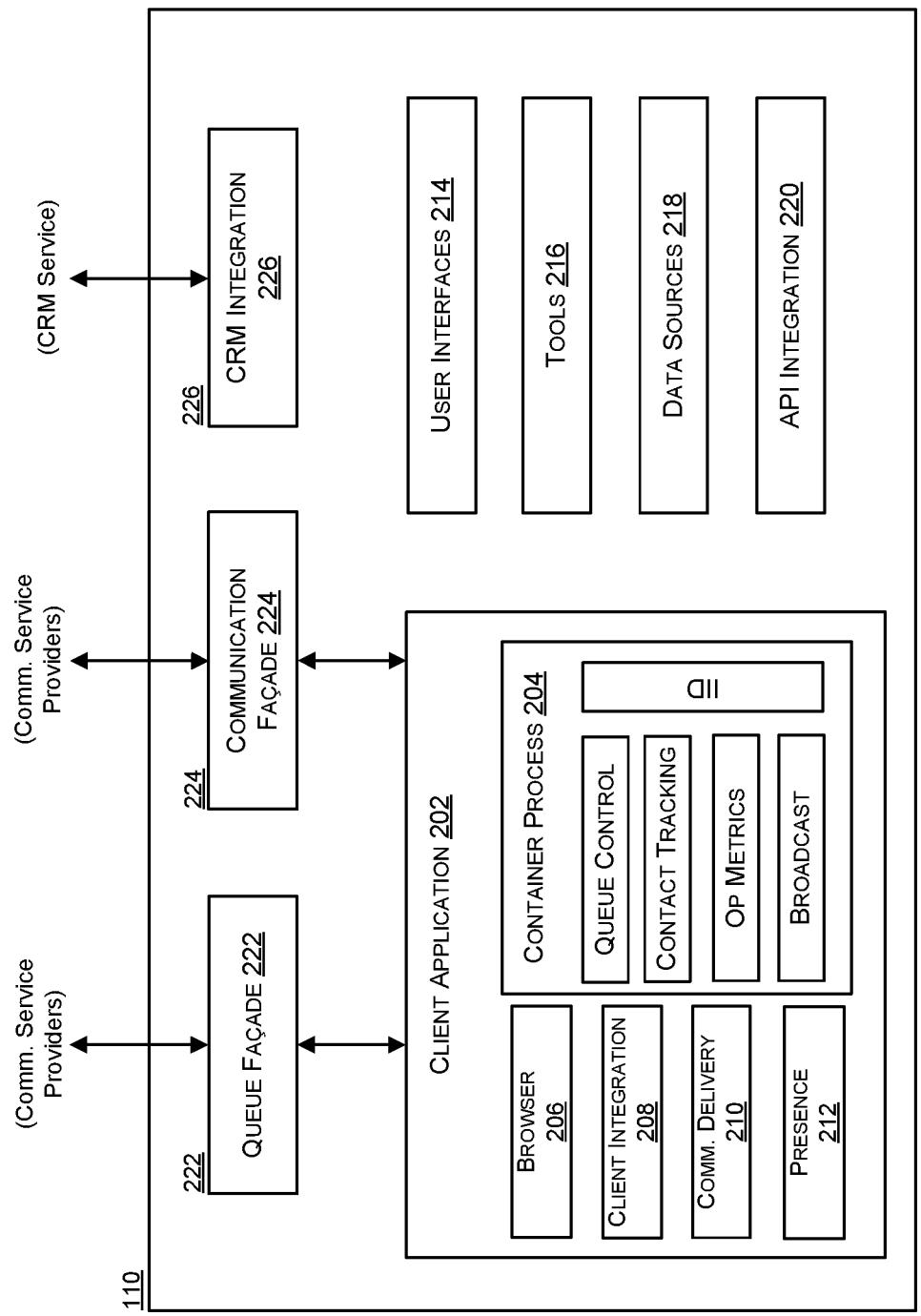
FIG. 2 illustrates an example of a client software framework for a representative client device, in accordance with one or more examples of the present disclosure.

FIG. 2 illustrates an example client software framework for a client device 110. The software components depicted in FIG. 2 may implement the various functionality of a client device 110 operating within a contact center. Using a software framework similar or identical to that depicted in this example, the client application 202 and/or other software components running on the client device 110 may receive and execute interactive sessions with customer devices 108 via communication services 104. The client application 202 also may interact with various other internal and external components associated with the contact center 100 to support common queuing from internal and external sources, and integrated contact center monitoring and modeling, as described below.

The example software framework shown in FIG. 2 may be implemented as a thick client framework. As a result of using a thick client framework like that depicted in this example, a larger portion of the processing tasks to provide the representative functionality in the contact center may be performed on the client device 110, while less of the processing tasks are performed on the servers of the contact center. In some examples, a thick client framework similar or identical to that shown in FIG. 2 may provide technical advantages in executing the multimedia components and processing the bandwidth intensive communication sessions of the client devices 110.

A client application 202 may be installed on the client device 110 to initiate and execute interactive sessions for the contact center. As noted above, communication sessions via the contact center allow an organization representative on a client device 110 to interact with a customer on an external customer device 108, using any of the supported communication types (e.g., voice, messaging/chat, email, video, social media, etc.). To enable communication sessions, the client application 202 may connect to an external communication service 104A-104E, receive and transmit user input from the local representative, and output the customer multimedia data received from the external communication service 104.

In some examples, the client application 202 may be a multi-process (or multi-threaded) application. For instance, each of the components 204-212 depicted within the client application 202 may correspond to a separate computing process. Process 204 may include functions to perform queue control, contract tracking, operational metrics, and broadcast functionality for the client application 202. As discussed below in more detail, in some cases process 204 may be a containerized process which is received from a server as a container image with packaged code along with an IID identifier. The container image may be unpacked and launched on the client device 110 to provide the representative functionality. The browser process 206 may be a lightweight (or thin) customized browser. For instance, the browser process 206 may execute the initial logic of the client application 202, including managing the representative login and authentication functions, after which the process 204 may be retrieved and downloaded from a server of the contact center. Additionally, as shown in this example, the client application 202 may include a separate client integration process 208, a communication delivery process 210, and a presence process 212.

As shown in this example, the software framework of the client device 110 may include a number of additional software components, including user interfaces 214, tools 216, data sources 218, API integration components 220, a queue façade 222, a communication façade 224, and a CRM integration component 226.

In some examples, the client application 202 may use the API integration components 220 to access the APIs exposed by the operating system of the client device 110. Such implementations may provide technical advantages over other contact center client applications. For instance, web browser-based and other thin client applications for contact center representatives may be unable to access the native APIs exposed by the client device. In contrast, the thick client framework examples described herein may provide advantages of web-based thin clients (e.g., uses of web-based techniques and protocols such as JS, CSS, and HTTPS to communicate with external services 104 during interactive sessions), along with advantages of thick clients including access to the file system and native APIs of the client device 110. In some examples, the client application 202 may record various state data of the client device 110 before, during, and/or after an interactive session with a customer (e.g., other open applications and windows, user behaviors and actions performed by the representative on the client device 110, etc.). The state data of the client device 110 may be analyzed along with the corresponding data associated with the interactive session (e.g., interaction transcript, customer sentiment, outcome/resolution of the contact, etc.), to provide more robust data for analyzing interactive sessions and representative performance in the contact center environment. Additionally, the multi-threaded thick client framework may improve the technical and/or digital quality of multimedia communication sessions (e.g., voice and/or video) provided via the contact center. For instance, the client application 202 may operate a first computing process (e.g., a thin web browser) to execute the application logic, and may launch a second computing process to handle a new interactive multimedia session with a customer. When the client device 110 includes multiple processors, the client application 202 also may assign the second computing process handling the communication session to a particular process based on the current processor loads, network traffic, and/or quality thresholds for multimedia sessions, in order to assure a higher-quality multimedia session with dedicate hardware, memory, and software resources.

The queue façade 222 and communication façade 224 software objects may provide common interfaces between the client application 202 and the external communication services 104. In some examples, the façades 222 and 224 may be implemented as services running on the client device 110, which expose APIs that may be invoked by an internal application (e.g., client application 202) and/or external applications (e.g., communication services 104). As noted above, façades 222 and 224 may be part of the integration layer 116 discussed above. Additionally, although façades 222 and 224 may execute on the client device 110 as shown in this example, one or both facades 222, 224 may be implemented outside of the client device 110 in other examples.

The queue façade 222 may include functionality allowing the client application 202 to manage its state in the contact center queues. For instance, based on the user inputs received via the client application 202, the queue façade 222 may determine that the representative user is available to handle a work item. The queue façade 222 also may determine from which external communication service 104 to request a live contact work item, and transmit the request. As discussed below, the queue façade 222 also may communicate with internal operation systems 114 of the contact center to request and receive non-live contact work items (which may be referred to as backlogged or deferred work).

The queue façade 222 may include logic to select the next work item (e.g., a new live customer contact, or a new deferred work item) to be presented to the representative, based on data received from the representative via the client application 202 and/or external data sources outside of the client device 110. For example, within the client application 202, the representative user may select one or more communication types (e.g., voice, chat, video, social media, etc.), areas of expertise (e.g., interaction categories or topics), and/or additional criteria (e.g., representative role, experience level, credentials or licenses) the define the parameters of the live contacts that the representative user prefers or is qualified to handle. In some cases, the client application 202 may automatically select the communication types for live contacts based on the type of the client device 110, the I/O components of the client device 110, and the current location or context of the devices. As an example, if the client device 110 lacks a display screen and a detached keyboard, the client application 202 may determine that the client device 110 may perform voice sessions but not chat or video sessions. As another example, if the client device 110 is a mobile device (e.g., laptop or smartphone) being operated in a public setting and significant background noise is detected via the APIs of the client OS, the client application 202 may determine that the client device 110 may perform web chat sessions but not voice or video sessions, etc.

Additionally or alternatively, the queue façade 222 may receive additional data from other data sources, such as the external communication services 104, internal operations systems 114, and/or the queue facades of other client devices 110. The additional data may include the current state of the various internal queues (e.g., deferred work items) and external queues (e.g., live contacts awaiting assignment) in the contact center, the profiles or characteristics of the other representatives that are currently active in the contact center, and the current sets of rules or policies implemented within the contact center to determine routing decisions, efficiency and quality thresholds, etc. Based on the various data received from the client application 202 and/or other data sources, the queue façade 222 may determine which communication service 104 to contact to request a new live contact, which internal operations system 114 to contact to request a deferred work item, and/or any parameters to be sent with such requests. When the representative user indicates via the user interface of the client application 202 that he/she is ready for a new work item (or when the client application 202 performs the determination automatically based on monitoring the activity of the client device 110), then the queue façade 222 may transmit a request to the selected communication service 104 for a connection to a new live contact and/or may transmit a request to an internal operations system 114 for a new deferred work item.

The communication façade 224 also may provide a common interface between the client application 202 and the external communication servers 104A-104E. In this example, the queue façade 222 may manage the state of the client application 202 in various queues of the contact center as described above, while the communication façade 224 includes the capabilities to deliver the media (e.g., text, audio data, video data, etc.) to and from the representative during the interactive session with the customer. In some scenarios, after the representative user begins work with the client application 202 (e.g., authenticates and/or logs-in), the client application 202 may instruct the queue façade 222 to transmit a device registration to one or more of the external services 104. The device registration may include an IP address associated with the communication façade 224. The external services 104 may transmit media content to the communication façade 224 during subsequent interactive sessions, and the communication façade 224 may relay the media content to the client application 202 for presentation to the user.

Figure 3:
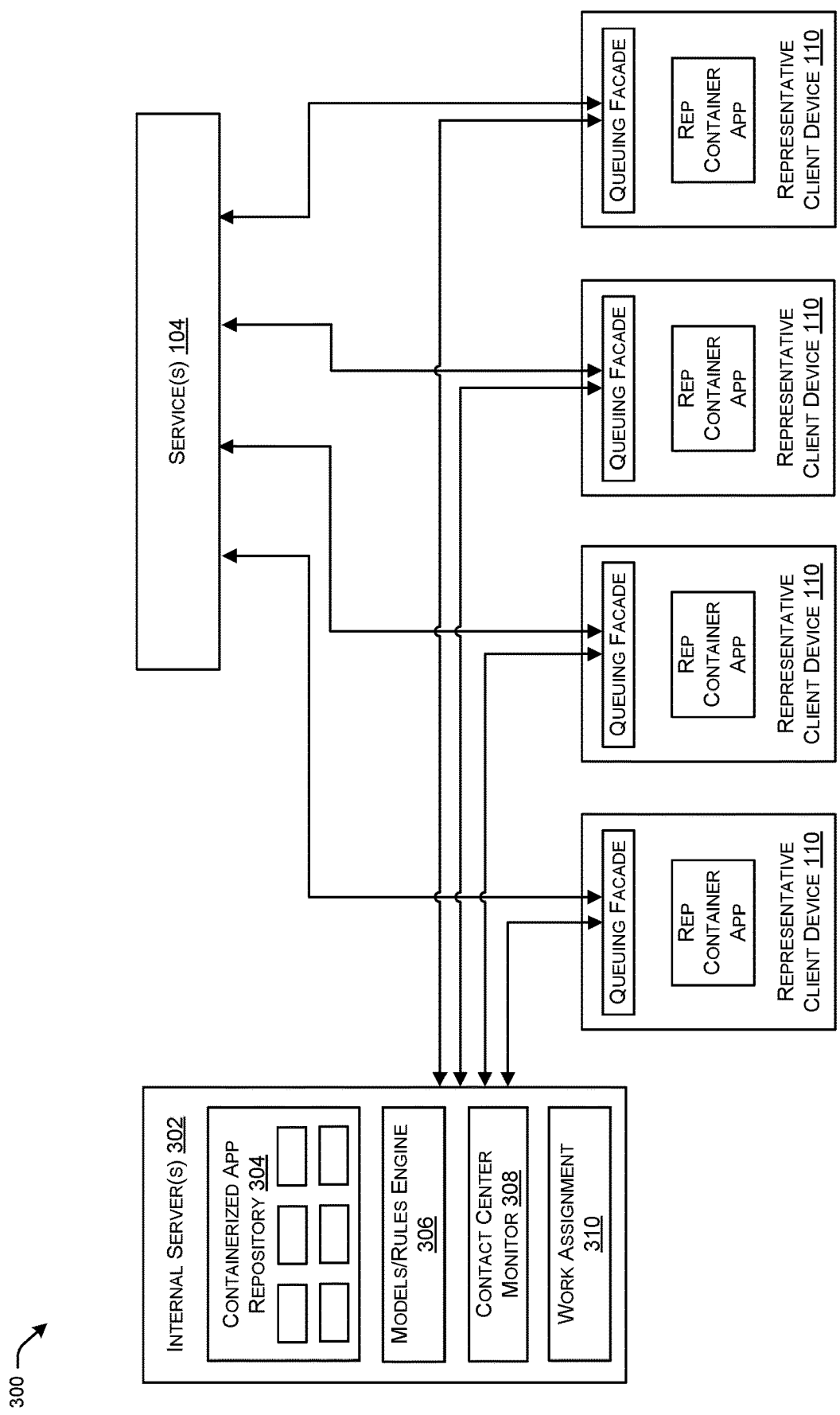
FIG. 3 illustrates an example computing environment associated with a contact center in accordance with one or more examples of the present disclosure.

FIG. 3 illustrates an example computing environment for a contact center 300, including multiple client devices 110, external services 104, and internal server(s) 302 on which one or more operational systems and/or components of the contact center may be implemented. The computing environment shown in FIG. 3 for contact center 300 may be similar or identical to the computing environment of the content center 100 described above, with different components and systems depicted to highlight the additional techniques performed by the internal servers 302 and/or client devices 110 of the contact center 300.

The client devices 110 depicted in FIG. 3 may be similar or identical to the client devices 110 described above. Each client device 110 in this example includes a queuing façade (e.g., queuing façade 222) and also may include a communication façade (not pictured) and any or all of the additional components described above in FIG. 2. Additionally, each client device 110 in this example includes a representative container application which may be received as a container image from internal server 302 and launched on the client device 110 to provide the functionality of the representative client application in the contact center. As discussed above, the container application may correspond to the entire client application 202 executing on the client device 110, or to a portion of the client application 202, such as process 204.

The service(s) 104 depicted in FIG. 3 may include the external communication services 104A-104E and third-party tools 105 described above. Additionally, although service(s) 104 are depicted in FIG. 1 as provided by external service providers, services 104 in contact centers 100 and 300 also may include internal services provided by the computing infrastructure within the contact center. Similarly, while the client devices 110 are depicted in FIG. 1 as internal devices within the contact center, in other examples client devices 110 may include external devices operated by representatives outside of the contact center computing and networking infrastructure.

Internal server(s) 302 may include one or more computer servers and/or various other computing components having one or more processor cores, co-processors, memory components, etc. In various examples, some or all of the internal computing infrastructure of a contact center (e.g., the components within dotted box 102) may be implemented within one or more physical data centers of the organization, and/or within public or private cloud computing infrastructures. As such, internal server(s) 302 may be implemented as physical computing devices, virtual server instances within a cloud infrastructure, or any combination of local and cloud-based computing resources. The internal server(s) 302 may implement any of the operational systems 114, as well as any of the internal communication services and tools described herein. As noted above, some or all portions of the internal server(s) 302 may reside in the integration layer 116.

As shown in this example, the internal server(s) 302 may include a repository 304 storing a number of containerized application images. In some examples, each image within the repository 304 may correspond to a client application 202, or to one or more portions of a client application (e.g., a containerized process 204 used by the framework of a client application 202). The images within the repository 304 may be requested by and transmitted to client devices 110, and the client devices 110 may unpack and execute the containerized application images to perform the client application 202 functionality. In some examples, different containerized application images within the repository 304 may be compatible with different types of client devices 110. For instance, the internal server may select a particular image in the repository 304 and transmit the image after receiving a request from a client device 110, where the image is selected based on the characteristics of the client device 110 including the device type (e.g., desktop, laptop, tablet, smartphone, etc.), the operating system (OS) and OS version of the client device 110, and the various hardware and software features of the client device 110 (e.g., the number of type of processors, the amount of memory, the display screen characteristics, the integrated and peripheral I/O components on the client device 110, etc.). As discussed below, in some examples a client application 202 executing on a client device 110 may request a containerized application image from the internal server(s) 302 in response to a successful login by a representative user. In such cases, the internal server(s) 302 may select the particular image from the repository 304 based on the characteristics of the representative user associated with the request (e.g., title or role, experience level, credentials or licenses, languages spoken, etc.).

Techniques including using a repository 304 of containerized application images may improve the functioning of the systems in contact center environments, by providing client applications 202 (or sub-processes therein) which are device specific and/or user specific to client devices 110. Additional technical advantages of such features within contact center environments may result from more efficient and streamlined software updates and modifications. For instance, when an organization is required to modify or reconfigure a thick client application, if the thick client application is installed on each separate client device 110 then a software update or patch may be transmitted to all client devices 110 associated with the contact center. These decentralized software updates may be uncoordinated, unreliable, and inefficient. In contrast, distributing containerized application images from a repository 304 stored in the internal server(s) 302 of the contact center may improve performance and distribution of software updates within the contact center.

Internal servers 302 also may include various models/rules components 306 to monitor and/or control the operations of the contact center. For instance, components 306 may include software tools and/or components (e.g., operational systems 114) that communicate with client devices 110 to monitor the status and functioning of the contact center, and to provide policies or instructions to client devices 110 based on the contact center status. Components 306 may include a rules engine executing heuristics-based logic to analyze the status data received from the client devices 110, and determine instructions and/or policies for representatives and/or client devices 110 based on the status data. Additionally or alternatively, components 306 may include various machine-learned models and algorithms to process the data received from client devices 110 and/or other components within the computing environment of the contact center 300. Various combinations of machine-learned models and algorithms may be used in different implementations, including but not limited to regression algorithms, instance-based algorithms, Bayesian algorithms, decision tree algorithms, clustering algorithms artificial neural network algorithms, and/or deep learning algorithms. The machine-learned models and algorithms within components 306 may receive input data from across the computing environments of contact centers 100 and 300, and may output operational predictions, policies, and/or recommendations relating to contact center efficiency, performance of representatives, contact quality metrics, performance of the computing infrastructure of the contact center, workflow/staffing management metrics, etc.

As noted above, the models/rules components 306 may receive input data from client devices 110 to monitor and analyze the performance of the contact center. The input data from the client devices 110 may include any data associated with the work items processed via the client application 202, including live contact work items (e.g., interactive sessions with customers) and/or deferred work items (e.g., post-session data entry or feedback). For live contact work items, at the conclusion of an interactive session the client application 202 may transmit data associated with the session (e.g., contact identifiers, times, topics, transcripts, resolutions, etc.) to the internal servers 302. In some examples, client application 202 also may transmit associated data received via the native APIs of the client device OS, which may include additional state data of the client device 110 before, during, and/or after the interactive session, such as which software applications and windows were open by the representative user, the behaviors and actions performed by the representative on the client device 110 during the interactive session, etc.

In addition to the data received from the client devices 110, the models/rules components 306 also may receive input data from various other components associated with the contact center, including data from communication services 104 (e.g., queue lengths and contact statistics, characteristics, feedback, etc.) and/or data from internal or third-party tools associated with the contact center (e.g., transcript analysis data, customer sentiment data, post-interactive session survey data, network traffic data, video quality data, etc.).

Using the input data collected from the across the contact center, the components 306 may execute various models and/or rules to analyze the data. Different rules and/or models may be implemented within the components 306 to determine status or performance metrics associated with the contact center, and/or to the determine policies and/or operational instructions to transmit to client devices 110. As an example, contact center efficiency models within the components 306 may be based on input data such as the number of interactive sessions processed by each client device 110, the length of the interactive sessions, the average representative lag or downtime between interactive sessions, the length of the queues in the services 104, the average wait time for customers, the number of dropped or abandoned sessions, etc. As another example, contact center quality models within the components 306 may be based on input data such as the types of interactive sessions (e.g., video, voice, chat, etc.), the features of the client devices 110 handling the contacts, the characteristics of each customer (e.g., language, demographics, mood/sentiment, and purpose for the contact), the corresponding characteristics of the representative that handled each customer (e.g., representative experience, training, credentials, or licenses, representative language, sentiment/mood, etc.), as well as the resolution of the interactive session (e.g., escalation, successful/unsuccessful resolution, product sale, refund status, etc.), data from a customer sentiment analysis tool, post-session feedback from the representative and/or the customer, etc. With respect to any of the metrics or dimensions described herein for analyzing the contact center (e.g., efficiency, quality, workflow/staffing, etc.), the various models and/or rules within the components 306 may analyze the current state of the metric or dimension across the contact center and/or predict a future state of the metric or dimension across the contact center.

After executing one or more models and/or rules within the components 306 to analyze the various data received from the systems and components associated with the contact center, outputs from the components 306 may be provided to one or systems to perform actions within the contact center based on the outputs of the models and/or rules. For example, the contact center monitor 308 may use the outputs from components 306 to monitor and track the health/status of the contact center, providing a centralized and holistic view of the contact center status that may be provided to administrator client devices 112, external systems, dashboards, etc. The contact center monitor 308 may include features that allow clients (e.g., administrator client devices 112) to view and track the status of the contact center as a whole, and/or to monitor the status of separate portions/subdivisions within the contact center (e.g., for specific representatives or groups of representatives, for specific contact centers or groups of contact centers, for specific departments/business units, for specific contact types, purposes, or media types, etc.).

Additionally, the work assignment component 310 may use the outputs from components 306 to determine instructions and/or policies that may be transmitted to client devices 110. Such instructions or policies may be used by the client application 202 and/or queue façade 222 to determine selection of work items (e.g., from which service 104 to request work items, live contact or deferred work items, weightings and preferences for particular contact types or characteristics, etc.).

Figure 4:
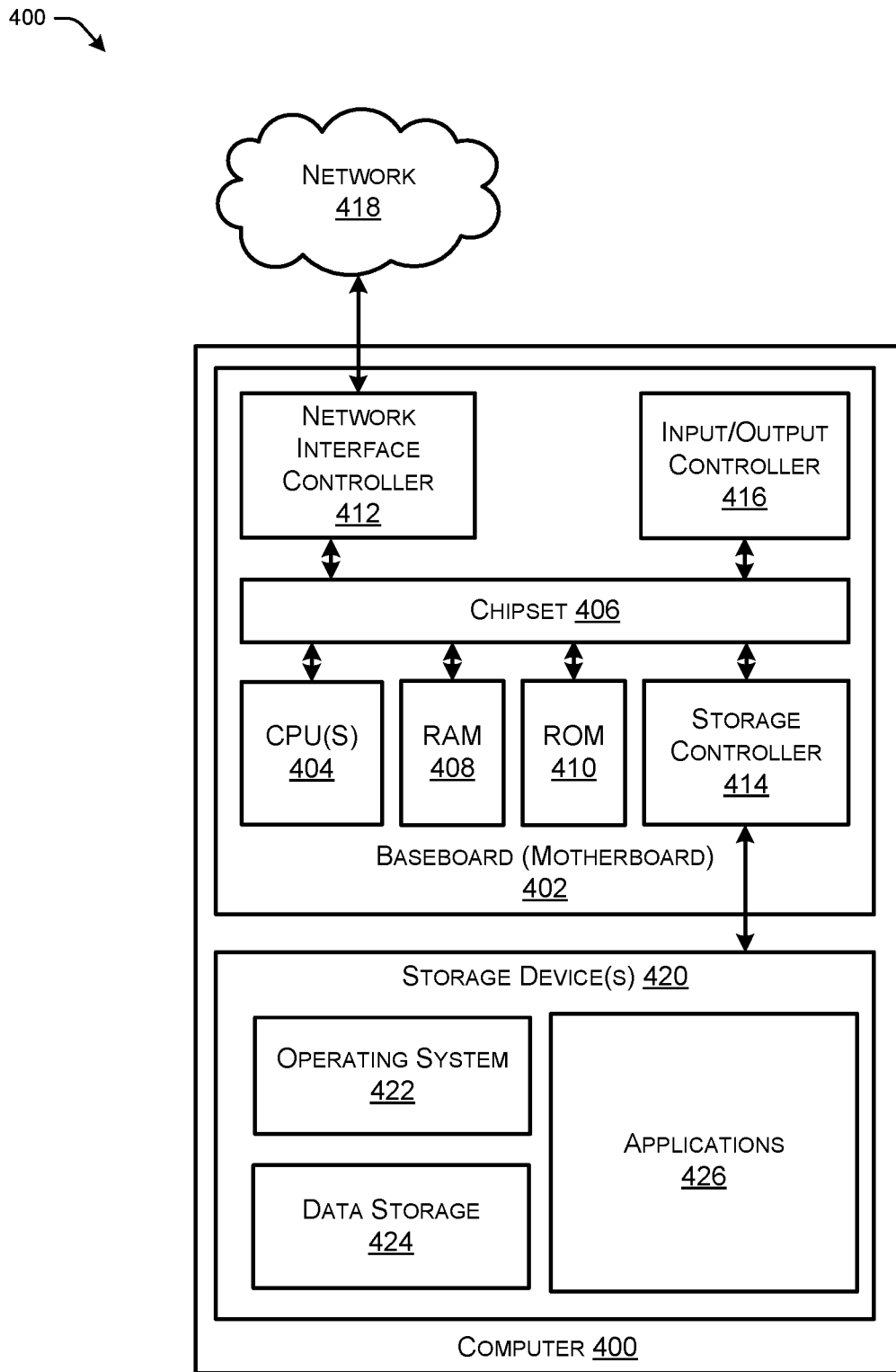
FIG. 4 is an example architecture for a computing device capable of executing program components for implementing various techniques described herein.

FIG. 4 shows an example computer architecture for a computer 400 capable of executing program components for implementing the functionality described herein. The computer architecture shown in FIG. 4 may correspond to the systems and components of a server computer, workstation, desktop computer, laptop, tablet, network appliance, mobile device (e.g., tablet computer, smartphone, etc.), or other computing device, and can execute any of the software components described herein. The computer 400 may, in some examples, correspond to any of the computing systems or devices described above, such as the client devices 110, administrator client devices 112, operational systems 114, internal servers 302, and/or any other computing devices described herein. It will be appreciated that in various examples described herein, a computer 400 might not include all of the components shown in FIG. 4, can include additional components that are not explicitly shown in FIG. 4, and/or may utilize a different architecture from that shown in FIG. 4.

The computer 400 includes a baseboard 402, or "motherboard," which may be a printed circuit board to which a multitude of components or devices are connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a ROM 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 418, which may be similar or identical to network 118 discussed above. The chipset 406 also may include functionality for providing network connectivity through a Network Interface Controller (NIC) 412, such as a gigabit Ethernet adapter. The NIC 412 is capable of connecting the computer 400 to other computing devices over the network 418. It should be appreciated that multiple NICs 412 can be present in the computer 400, connecting the computer to other types of networks and remote computer systems. In some instances, the NICs 412 may include at least on ingress port and/or at least one egress port.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device.

The computer 400 can include one or more storage device(s) 420, which may be connected to and/or integrated within the computer 400, that provide non-volatile storage for the computer 400. The storage device(s) 420 can store an operating system 422, data storage systems 424, and/or applications 426, which are described in more detail herein. The storage device(s) 420 can be connected to the computer 400 through a storage controller 414 connected to the chipset 406. The storage device(s) 420 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device(s) 420 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 420 are characterized as primary or secondary storage, and the like.

For example, the computer 400 can store information to the storage device(s) 420 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device(s) 420 by detecting the physical states or characteristics of one or more particular locations within the physical storage units.

In addition to the storage device(s) 420 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the various operations performed by a computing system (e.g., client devices 110, internal servers 302, etc.) may be supported by one or more devices similar to computer 400. Stated otherwise, some or all of the operations described herein may be performed by one or more computers 400 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 420 can store an operating system 422 utilized to control the operation of the computer 400. In some examples, the operating system 422 comprises a LINUX operating system. In other examples, the operating system 422 comprises a WINDOWS® SERVER operating system from MICROSOFT Corporation of Redmond, Washington. In further examples, the operating system 422 can comprise a UNIX operating system or one of its variants. It should be appreciated that other operating systems can also be utilized. The storage device(s) 420 can store other system or application programs and data utilized by the computer 400.

In various examples, the storage device(s) 420 or other computer-readable storage media is encoded with computer-executable instructions which, when loaded into the computer 400, transform the computer from a general-purpose computing system into a special-purpose computer capable of implementing various techniques described herein. These computer-executable instructions transform the computer 400 by specifying how the CPUs 404 transition between states, as described above. In some examples, the computer 400 may have access to computer-readable storage media storing computer-executable instructions which, when executed by the computer 400, perform the various techniques described herein. The computer 400 can also include computer-readable storage media having instructions stored thereupon for performing any of the other computer-implemented operations described herein.

As illustrated in FIG. 4, the storage device(s) 420 may store one or more data storage systems 424 configured to store data structures and other data objects. Additionally, the software applications 426 stored on the computer 400 may include one or more client applications, services, and/or other software components. For example, for a client device 110, application(s) 426 may include client applications 202, queue and communication façades 222 and 224, and/or other software components described in reference to FIG. 2. For an example internal server 302, the applications 426 may include the various models/rules components 306, contact center monitor 308, and work assignment component 310 described in reference to FIG. 3.

Figure 5:
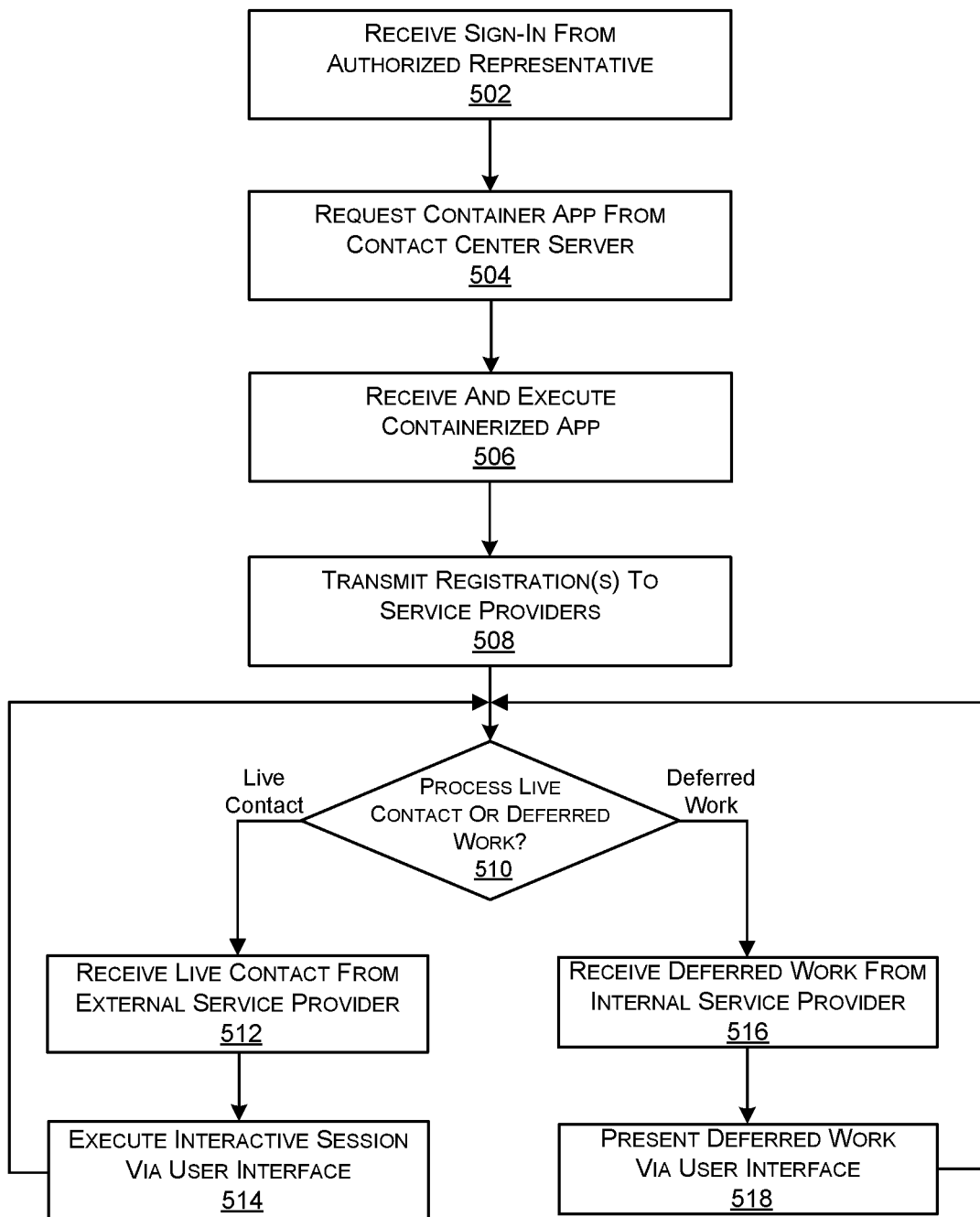
FIG. 5 is a flow diagram illustrating an example process performed by a representative client application, in accordance with one or more examples of the present disclosure.

FIG. 5 is a flow diagram illustrating a process 500 of receiving and processing work items (e.g., live contacts and deferred work) by a representative client device of a contact center. As discussed below, the techniques and operations of process 500 may be performed by software components executing within the client device 110, such as the client application 202, queue and communication facades 222 and 224, and the other software components of the client devices 110 described herein. Additionally, it should be understood that these software components (e.g., the client application 202, queue façade 222, communication façade 224, etc.) may execute on the hardware infrastructure and components (e.g., processor(s), memory, network(s), etc.) of the client device 110, and thus techniques and operations of process 500 also may be described as being performed by the processors and/or other hardware-based devices executing instructions stored on a computer-readable media of the client devices 110.

At operation 502, the client device 110 may receive a sign-in (or login) from an authorized representative user. The sign-in (or login) in operation 502 may include, by way of example, username and/or password inputted by representative user into the client device 110. The user login may be a user login into the operating system of the client device 110 and/or a login into the client application 202. For instance, when a thick click implementation is used as described above, a thin browser process may execute within the client application 202 prior to the login by the representative user, and one or more additional processes may be launched after the user login to perform the functionality of the containerized application process, the interactive sessions, etc.

In some examples, operation 502 may be optional and a login by the representative user might not be required. For instance, if the client device 110 is operated within a secure location (e.g., a datacenter within the organization facilities), and if all representatives at the location are equally trained and qualified with respect to execution interactive sessions with customers and/or performing other functions via the client application 202, then a login by the representative user to the client device 110 or the client application 202 may be unnecessary. However, when different representative users have different characteristics or attributes (e.g., different departments or business units within the organization, different areas of expertise, different credentials or licenses, different language skills, etc.), then the client application 202 and/or internal server(s) 302 may use the login data to identify the representative user and to associate the user with different contact types, media, contact purposes, or other contact characteristics. For instance, the components of the client application framework and/or other internal systems of the contact center may implement queue routing techniques and other models/policies to match representative users having certain characteristics with particular customers having compatible characteristics or attributes. In such scenarios, the login data received in operation 502 may be used to identify the representative user and retrieve the associated characteristics or attributes for the user.

At operation 504, the client device 110 may request a containerized application image from a server associated with the contact sever. In some examples, the request at operation 504 may be performed in response to a successful login at operation 502. As discussed above, the containerized application images may be stored in a separate internal server 302 of the contact center, and the client device 110 may send a request to internal server 302 for a containerized application image to be provided to and executed on the client device 110. In some examples, the request in operation 504 may include information identifying the representative user and/or characteristics of the user, which may be determined based on the login from operation 502. The request in operation 504 also may include data identifying characteristics of the client device 110 (e.g., device type, operating system, hardware features, etc.) and/or the current environment/context of the client device 110 (e.g., current location, motion patterns, background noise, lighting, etc.).

At operation 506, the client application 202 may receive, unpack, and execute the containerized application image requested from the internal server 302 in operation 504. As noted above, the internal server 302 may select an application image from the repository 304 and transmit the image to the client device 110. In some cases, the image may correspond to the entire client application 202. In such cases, a separate thin application running on the client device 110 may process the initial user login in operation 502 and request in operation 504. Alternatively, the image received in operation 506 may correspond to one or more separate computing processes (e.g., process 204) within the existing client application 202 executing on the client device 110.

In some examples, the internal server 302 may select and transmit an identical containerized application image to all client devices 110 within the contact center environment. In other examples, the internal server 302 may store different images in the repository 304 and may select a particular image based on the characteristics of the representative user, client device 110, and/or other data. For instance, the internal server 302 may select the containerized application for transmission in operation 506 based on the type of the client device (e.g., device type, make/model, OS, hardware and software features, etc.). Additionally or alternately, the internal server 302 may select the containerized application based on the characteristics of the representative user (e.g., role, department, experience, credentials or licenses, etc.), and/or based on the current location/context of the client device 110. Operations 504 and 506 also may be optional and need not be performed in some implementations. For instance, the complete client application 202 may be installed and may remain indefinitely on the client device 110. However, as discussed above, implementations in which some portions of (or the entire) client application 202 is received from an internal server 302 as a containerized application image may provide technical advantages with respect to installing software updates and patches.

At operation 508, the client application 202 and/or queue façade 222 within the client device 110 may transmit registration requests to one or more of the external communication services 104. The registration requests may indicate to the services 104 that the client device 110 and/or client application 202 are authorized as representatives of the organization to execute interactive sessions with customers. In some examples, the representative user may select one or more communication types (e.g., voice, messaging/chat, video, social media, etc.) via the user interface of the client application 202, and the client application 202 may call APIs of the queue façade 222 that cause the queue façade 222 to determine the services 104 associated with the selected communication types and to transmit the registration requests. Additionally or alternatively, the client application 202 may automatically determine the services 104 based on information such as the capabilities and current context of the client device 110, the current queue status and average customer wait times of the services 104, and/or the numbers of other client devices 110 registered at the various services 104.

At operation 510, the representative user may indicate via the user interface of the client application 202 that the user is ready to handle a new work item for the contact center. As noted above, work items for the representative user may include live contacts (e.g., interactive sessions with customers) and/or deferred work items such as post-session forms or data entry associated with previous live contacts, training or other processing tasks for the user to perform via the client application 202. In some cases, the client application 202 may provide a single user interface component that the user may select to request a new work item, and the components within client application 202 and/or queue façade 222 may execute rules and/or models to determine whether to request a new deferred work item or a new live contact, and from which internal or external service the deferred work item or live contact is to be requested. For example, the queue façade 222 of the client device 110 may query one or more of the external communication services 104 to determine the average wait time for the customers currently awaiting in the incoming contact queue(s) for assignment to a contact center representative. In this example, if the average wait time exceeds a time threshold, the queue façade 222 may request a new live contact from an external communication service 104 having the longest average wait time, and if the average wait time does not exceed the time threshold, the queue façade 222 may request a deferred work item from an internal server 302.

In other cases, the user interface of the client application 202 may allow the user to request either a deferred work item or a new live contact work item, and/or may allow the user to request a live contact from a specific service 104. When the client application 202 and/or queue façade 222 execute logic to determine from which internal/external service to request a new work item, the determination may be based on status data received by the queue façade 222 from the other systems and components of the contact center, such as the current queue backlogs of any internal or external queuing engines, average customer wait times of the communication services, which live contacts and/or deferred work items match the characteristics and qualifications of the representative user and/or the availability of other representative users in the contact center to handle various work items.

When the client application 202 and/or queue façade 222 determines that that a live contact work item is to be executed at the client device 110, then at operation 512 the client application 202 may send a request to the selected external communication service 104 to initiate an interactive session between the client application 202 and a customer operating a remote customer device 108. The external communication service 104 may select a customer contact from a queue, assign the contact to the client application 202, and initiate the transfer of media data (e.g., voice data, streaming video, messaging/chat data, etc.) between the customer device 108 and the communication façade 224 of the client device 110. At operation 514, the client application 202 may execute the interactive session via the user interface and I/O components of the client device 110, during which representative user and customer may interact via media streams and/or data transfers via the external communication service 104.

When the client application 202 and/or queue façade 222 determines that that a deferred work item is to be executed at the client device 110, then at operation 516 the client application 202 may request and receive a software object (e.g., electronic form, document, interactive program, etc.) corresponding to the deferred work item to be completed by the representative user. As noted above, deferred work items may include post-session forms or data entry tasks associated with previous live contacts handled by the representative, training tasks, or any other processing tasks required for the representative user via the client application 202. At operation 516, the client application 202 may present the deferred work item via the user interface to allow user interaction and completion of the work item. When the representative user processes and/or completes the deferred work item at operation 518 and/or the interactive session at operation 514, the client application 202 may upload the status/results of the work item to the internal server 302 and/or operational systems 114, and may return to operation 510 to process another work item.

As described above, FIG. 5 illustrates an example of a common queuing framework for representative client devices 110 within a contact center 100. The common queuing framework, which may include the client application 202, queue façade 222, and/or components within the internal server 302, may interact to request and receive work items from various external and internal contact center services, such as external communication services 104 (e.g., for live customer interaction sessions) and internal operational systems 114 (e.g., for deferred work items). As described above, the client device 110 receive and execute work items from these diverse internal and external services in consistent and uniform manner, allowing the operational systems 114 to improve the performance, contact quality, and workflow across the contact center.

Figure 6:
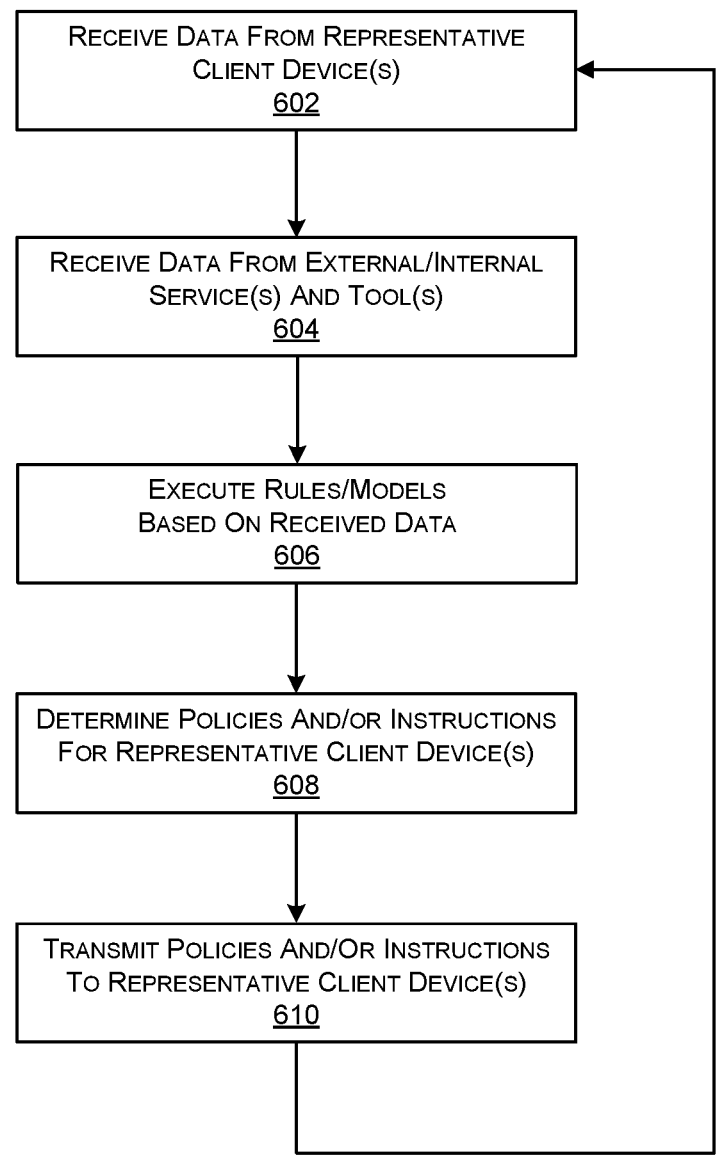
FIG. 6 a flow diagram illustrating an example process performed by a contact center, in accordance with one or more examples of the present disclosure.

FIG. 6 a flow diagram illustrating an example process 600 of monitoring the systems and components of a contact center, executing rules or models based on the input data, and determining policies or operational instructions for client representative devices to control the operations of the contact center. As discussed below, the techniques and operations of process 600 may be performed by various systems and components within computing environments of the contact centers 100 and 300, such as the operational systems 114, internal servers 302, and/or other software components of the contact center described herein.

At operation 602, an internal computing device or system within a contact center environment (e.g., internal server(s) 302) may receive data from one or more client devices 110. As discussed above in reference to FIG. 3, the models/rules components 306 of the internal server(s) 302 may receive data from client devices 110, including data associated with any live contact work item and/or any deferred work item processed by the client applications 202 of the client devices 110. For live contact work items, a client application 202 may transmit the associated data at the conclusion of the interactive session with the customer (e.g., customer identifier, session times, transcript data, resolution, etc.). For deferred work items, a client application 202 also may transmit associated data such as the work item duration and completion times, resolution of the work item, etc. In various examples, client applications 202 also may transmit data received via the native APIs of the operating system of the client device 110, such as the current state, location, and/or context of the client device 110 before, during, and/or after the interactive session or deferred work item. Such native API data also may include which software applications and windows are open on the client device of the representative user and/or the behaviors and actions performed by the representative user on the client device 110, while executing the interactive session for a live contact or performing a deferred work item.

At operation 604, the internal server(s) 302 may receive additional data from one or more external and/or internal services or tools within the contact center environment. For instance, the internal server(s) 302 may receive periodic state data and/or reports from external communication services 104, including data such as the number of live contacts processed, current queue lengths, live contact statistics, interactive session time durations, initial pre-session classifications, and post-session customer feedback, etc. Internal server(s) 302 also may receive data from internal and/or third-party services and tools associated with the contact center, including services/tools such as transcript analysis tools, customer sentiment tools, post-session surveys from customers or representatives, etc. Additional data received by the internal server(s) 302 in operation 604 may include computer server/device monitoring tools and/or networking monitoring tools of within the contact center environment, such as network traffic monitoring tools, processor monitoring tools, video/media session quality tools, etc.

At operation 606, the internal server(s) 302 may execute various rules and/or models based on the data received at operations 602 and 604. As discussed above in reference to FIG. 3, the rules/model components 306 may provide the data received from the client devices 110 and other contact center systems and components as inputs into trained-machine learned models and/or heuristics-based rules engines, to determine various status or performance metrics associated with the contact center. The data output by the execution of the rules/models in operation 606 may include efficiency data for individual client devices 110, particular groups of devices, and/or collectively for all client devices 110 in the contact center. Additional data output by the execution of the rules/models in operation 606 may include contact quality data generated by the internal server(s) 302 based on the input data such as the interactive session types for live contacts, the features or characteristics of the client devices 110 that executed the live contacts, the characteristics of the contact/customer, the characteristics of the representative user in the interactive session, and any other characteristics of the live contact such as the interactive session time and duration, the resolution of the interactive session, the output of a transcript analysis tool or customer sentiment tool, post-session feedback from the representative and/or the customer, etc.

At operation 608, based on the outputs from the rules/models executed at operation 606, the internal server(s) 302 may determine various policies and/or instructions for the client devices 110 within the contact center environment. The policies or instructions determined in operation 608 may be policies that determine which work items are to be selected and requested for processing by a client application 202 and/or queue façade 222. For instance, instructions or policies may be determined that cause a queue façade 222 to increase a weight in favor of live contact work items, increasing the likelihood that the queue façade 222 may select live contact work items rather than deferred work items, or vice versa. Other instructions or policies determined in operation 608 may cause a client application 202 or queue façade 222 to select or weight certain external communication services 104 instead of others. Still other instructions or policies determined in operation 608 may determine a script or suggested interaction strategy for the representative during a live contact interactive session, or the suggested amount of delay/lag time between live contact interactive sessions, etc.

In operation 610, the internal server(s) 302 may transmit the instructions/policies determined in operation 608 to various client devices 110 in the contact center environment. For any instructions or policies determined in operation 608, the instructions/policies may be determined for a specific client device 110, or a group of client devices 110, while other instructions/policies may apply to all client devices 110 in the contact center environment. In such examples, the groupings of client devices 110 that may receive the same policies/instructions can be based on the device types and hardware, software, OS, and/or network features of the client devices 110. Additionally or alternatively, groupings of devices to receive the same instructions/policies may be based on the characteristics of the representatives currently operating the client devices 110, the current locations/contexts of the client devices 110, etc. When a client device 110 receives updated policies/instructions from the internal server(s) of the contact center, the queue façade 222 and/or client application may validate the updated policies/instructions and then integrate the updated policies/instructions into the various functional application components within the client application framework (e.g., for contact queueing routing, contact processing, post-session reporting, etc.).

As illustrated by the examples above, the various techniques described herein may provide technical advantages for the operation of contact center environments and improve the functioning of the various contact center devices and systems. For instance, the integration layer 116 implemented within representative client devices 110 and/or internal servers 302 may improve the operation of the contact center 100 by supporting plug-and-play functionality in which client devices 110 can interact in a seamless and uniform manner with various different external communication services 104 and third-party tools 105. The integration layer 116 also may provide a common interface for accessing the external services 104 and tools 105, so that the various services 104 and tools 105 may be added, removed, replaced, or upgraded, without requiring any changes to the client application 102 or other software components within the internal contact center.

Additionally, the integration layer 116 provides a common queuing framework for representative client devices 110, which may further improve the operation of the contact center by intelligently managing the execution of work items from various internal and external queuing engines in a coordinated manner across the contact center 100. As illustrated above, individual client devices 110 may execute trained models and/or rules engines to determine from which services and queues to request work items, including live customer contact queues from external communication services 104 and/or deferred work item queues from internal operational systems 114. The integration layer 116 also may provide internal servers 302 of the contact center 100 with detailed data regarding the interactive sessions executed by different client devices 110 across the contact center 100 in a consistent and uniform manner, allowing the internal servers 302 to analyze the status and performance of the client devices 110 and the contact center 100 as a whole. The internal servers 302 may implement models across the contact center 100, determining and transmitting instructions and/or policies to individual client devices 110, to implement and manage models that improve the performance, contact quality, and workflow/staffing across the contact center 100.

Further, the thick client framework for client applications 202, queue facades 222, etc., described in the above examples may provide technical advantages of more efficient and streamlined software updates and modifications across the contact center 100. For instance, when the contact center organization is required to modify or reconfigure the client application 202 software, if the thick client framework is used as described above, the internal server(s) 302 of the contact center 100 perform the software updates and modifications by distributing containerized application images from a repository 304 stored in the internal server(s) 302 to the individual client devices to improve performance and reliability of the software distribution and updates within the contact center.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
   receiving first data from a first client computing device, the first data associated with a first interactive communication session executed via the first client computing device associated with a contact center;
   receiving second data from a second client computing device, the second data associated with a second interactive communication session executed via the second client computing device associated with the contact center;
   determining a status of the contact center based at least in part on the first data and the second data; and
   transmitting operational instructions to one or more client computing devices associated with the contact center, based on the status of the contact center.

2. The method of claim 1, wherein the first data received from the first client computing device comprises:
   data collected by a client application executing the first interactive communication session; and
   data collected by the client application via an application programming interface (API) of an operating system of the first client computing device.

3. The method of claim 1, wherein determining the status of the contact center comprises at least one of:
   determining an interactive communication session quality metric based at least in part on the first data and the second data; or
   determining a client efficiency metric based at least in part on the first data and the second data.

4. The method of claim 1, wherein determining the status of the contact center comprises:
   providing the first data and second data as input to a trained machine-learned model; and
   determining the status of the contact center based at least in part on an output from the trained machine-learned model.

5. The method of claim 1, wherein transmitting the operational instructions comprises:
   determining, based at least in part on the first data and the second data, a policy for use by a plurality of client computing devices associated with the contact center to determine selection of work items; and
   transmitting the policy to the plurality of client computing devices, including the first client computing device and the second client computing device.

6. The method of claim 1, wherein transmitting the operational instructions comprises:
   receiving communication service data from a first communication service provider associated with the first interactive communication session; and
   determining the operational instructions based at least in part on the communication service data.

7. The method of claim 1, wherein transmitting the operational instructions comprises:
   determining an interactive communication session metric associated with the contact center, the interactive communication session metric comprising at least one of a transcript analysis metric, a customer sentiment metric, a customer feedback metric, a network traffic metric, or a video quality metric; and
   determining the operational instructions based at least in part on the interactive communication session metric.

8. The method of claim 1, further comprising:
   receiving, from the first client computing device, a request for a work object; and
   transmitting a work object to the first client computing device, the work object comprising a third interactive communication session to be initiated by the first client computing device, via an external service provider over an unsecured public network.

9. The method of claim 1, further comprising:
   receiving, from the first client computing device, a request for a work object; and
   transmitting a work object to the first client computing device, the work object comprising a deferred work object received from an internal service provider over a secure private network.

10. A computing system, comprising:
    one or more processors; and
    memory storing processor-executable instructions that, when executed by the one or more processors, cause the computing system to perform operations comprising:
        receiving first data from a first client computing device, the first data associated with a first interactive communication session executed via the first client computing device;

receiving second data from a second client computing device, the second data associated with a second interactive communication session executed via the second client computing device;

determining a status of a contact center based at least in part on the first data and the second data; and transmitting operational instructions to one or more client computing devices associated with the contact center, based on the status of the contact center.

11. The computing system of claim 10, wherein the first data received from the first client computing device comprises:

data collected by a client application executing the first interactive communication session; and data collected by the client application via an application programming interface (API) of an operating system of the first client computing device.

12. The computing system of claim 10, wherein determining the status of the contact center comprises at least one of:

determining an interactive communication session quality metric based at least in part on the first data and the second data; or determining a client efficiency metric based at least in part on the first data and the second data.

13. The computing system of claim 10, wherein determining the status of the contact center comprises at least one of:

determining an interactive communication session quality metric based at least in part on the first data and the second data; or determining a client efficiency metric based at least in part on the first data and the second data.

14. The computing system of claim 10, wherein transmitting the operational instructions comprises:

determining, based at least in part on the first data and the second data, a policy for use by a plurality of client computing devices associated with the contact center to determine selection of work items; and transmitting the policy to the plurality of client computing devices, including the first client computing device and the second client computing device.

15. The computing system of claim 10, wherein transmitting the operational instructions comprises:

receiving communication service data from a first communication service provider associated with the first interactive communication session; and determining the operational instructions based at least in part on the communication service data.

16. The computing system of claim 10, wherein transmitting the operational instructions comprises:

determining an interactive communication session metric associated with the contact center, the interactive communication session metric comprising at least one of a transcript analysis metric, a customer sentiment metric, a customer feedback metric, a network traffic metric, or a video quality metric; and determining the operational instructions based at least in part on the interactive communication session metric.

17. The computing system of claim 10, the operations further comprising:

receiving, from the first client computing device, a request for a work object; and transmitting a work object to the first client computing device, the work object comprising a third interactive communication session to be initiated by the first client computing device, via an external service provider over an unsecured public network.

18. The computing system of claim 10, the operations further comprising:

receiving, from the first client computing device, a request for a work object; and transmitting a work object to the first client computing device, the work object comprising a deferred work object received from an internal service provider over a secure private network.

19. A non-transitory computer readable medium comprising program instructions that when executed, cause a computer to:

receive first data from a first client computing device, the first data associated with a first interactive communication session executed via the first client computing device;

receive second data from a second client computing device, the second data associated with a second interactive communication session executed via the second client computing device;

determine a status of a contact center based at least in part on the first data and the second data; and transmit operational instructions to one or more client computing devices associated with the contact center, based on the status of the contact center.

20. The non-transitory computer readable medium of claim 19, wherein determining the status of the contact center comprises at least one of:

determining an interactive communication session quality metric based at least in part on the first data and the second data; or determining a client efficiency metric based at least in part on the first data and the second data.

* * * * *